United States Patent
Yamada (10) Patent No.: US 8,570,643 B2
(45) Date of Patent: Oct. 29, 2013

(54) METHOD OF MAKING OPTICAL ELEMENT AND OPTICAL ELEMENT

(75) Inventor: Daisuke Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 323 days.

(21) Appl. No.: 12/880,999

(22) Filed: Sep. 13, 2010

(65) Prior Publication Data

US 2011/0063716 A1 Mar. 17, 2011

(30) Foreign Application Priority Data

Sep. 15, 2009 (JP) .................................. 2009-212764

(51) Int. Cl.
*G02B 26/08* (2006.01)
*G02B 27/00* (2006.01)

(52) U.S. Cl.
USPC .......................................... 359/298; 359/577

(58) Field of Classification Search
USPC ......... 359/298, 321, 483, 577, 578, 580–587, 359/589
See application file for complete search history.

(56) References Cited

U.S. PATENT DOCUMENTS

| 5,973,823 A * | 10/1999 | Koops et al. .................. 359/322 |
| 6,938,325 B2 * | 9/2005 | Tanielian ..................... 29/602.1 |
| 2004/0151876 A1 | 8/2004 | Tanielian |
| 2007/0014006 A1 | 1/2007 | Tanaka et al. |

FOREIGN PATENT DOCUMENTS

| JP | 2006-350232 A | 12/2006 |
| JP | 2008187099 A | 8/2008 |
| JP | 2009151040 A | 7/2009 |

OTHER PUBLICATIONS

Klein et al., "Single-slit split-ring resonators at optical frequencies: limits of size scaling," Optics Letters, May 1, 2006, vol. 31, No. 9, pp. 1259-1261.

* cited by examiner

*Primary Examiner* — Dawayne A Pinkney
(74) *Attorney, Agent, or Firm* — Canon U.S.A., Inc. IP Division (57) ABSTRACT

A method of making an optical element, the optical element including magnetic resonators that are anisotropically shaped and smaller than a wavelength of incident light, includes a first step of dispersing the magnetic resonators in a host medium, a second step of applying an external magnetic field to the host medium after the first step, and a third step of curing the host medium after the second step.

7 Claims, 10 Drawing Sheets

METHOD OF MAKING OPTICAL ELEMENT AND OPTICAL ELEMENT

BACKGROUND OF THE INVENTION

1. Field of the Invention

The present invention relates to a method of making an optical element and to the optical element. In particular, the present invention relates to a method of making an optical element whose effective permeability is artificially changed by including magnetic resonators and to the optical element.

2. Description of the Related Art

Metamaterials have been proposed in recent years. A metamaterial is a material including a medium and artificial structures. The artificial structures are made of a metal, a dielectric, or a magnetic substance and smaller than the wavelength of incident light. By including the artificial structures, the permittivity or the permeability of the metamaterials are artificially changed from that of the medium. For example, when a metamaterial is made so as to have a negative permittivity and a negative permeability, a negative refractive index can be realized. By using a negative refractive index, a new optical phenomenon, such as imaging beyond the diffraction limit (perfect lens), can be caused. By independently controlling the permittivity and the permeability, the impedance can be appropriately controlled, whereby perfect reflection and a structure having a reduced reflectivity can be realized. Moreover, by controlling the permittivity and the permeability, applications having new optical characteristics that do not exist in nature have been proposed.

Figure 11:
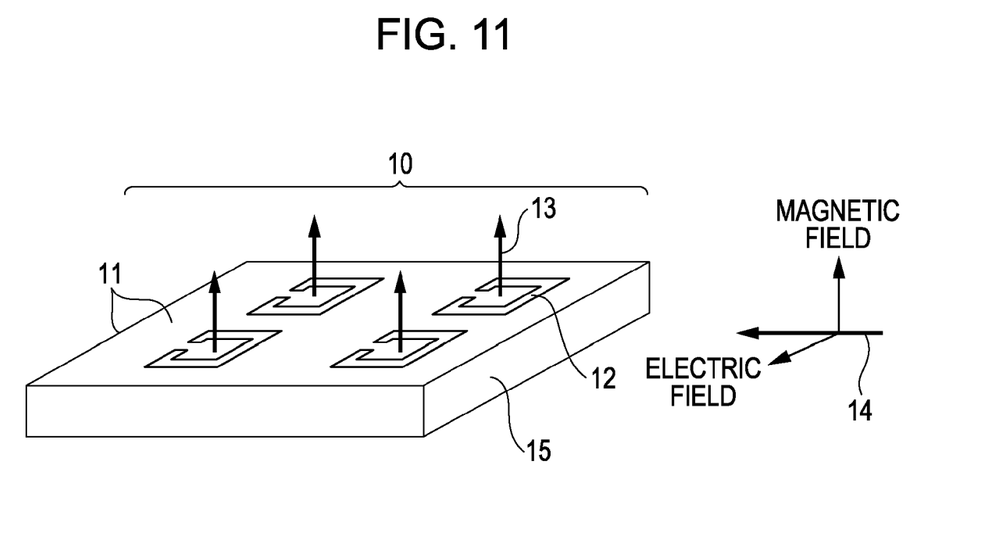
FIG. 11 illustrates an existing optical element.

Examples of the structures that enable artificial control of permeability include magnetic resonators such as split-ring resonators. The magnetic resonators change the permeability by resonating with the magnetic field component of an incident light wave. By including the magnetic resonators in an optical element, the effective permeability of the optical element can be changed. An optical element including the magnetic resonators is usually made by creating small structures made of a metal or the like by lithography such as electron beam lithography (Optics Letters, vol. 31, pp. 1259-1261, 2006). A method of depositing a metal by focusing a laser beam on a metallic complex ion dispersion that is dispersed in a medium has been proposed (Japanese Patent Laid-Open No. 2006-350232). In both of these methods, an upper surface of a substrate is processed so as to make a layer including magnetic resonators, and the layer is stacked so as to make an optical element 10 as illustrated in FIG. 11. Because the upper surface of a substrate 11 is processed, split rings that function as magnetic resonators 12 are disposed parallel to the substrate 11. Therefore, resonance directions 13 of the magnetic resonators 12 are perpendicular to the substrate 11.

In the existing optical element 10 illustrated in FIG. 11, in order to make the magnetic resonators 12 resonate with the magnetic field component of a light wave 14 that is incident on the optical element, it is necessary that the light wave 14 be incident in a direction parallel to the substrate 11, because the magnetic field component of the light wave 14 is perpendicular to the direction of incidence. Therefore, the existing optical element 10 has an incident surface 15 on a side of the substrate 11, which leads to a problem in that the cross-sectional area of incidence of the optical element 10 is small. The use of an optical element having a small cross-sectional area of incidence is limited to a planar waveguide or the like. Making an optical element having a large cross-sectional area of incidence is difficult, because it is necessary to increase the number of stacks. For example, if the thickness of one stack is 1 μm, about 1000 stacks are necessary to obtain an incident surface having a thickness of 1 mm, and about 10000 stacks are necessary to obtain an incident surface having a thickness of 1 cm.

SUMMARY OF THE INVENTION

The present invention provides a method of making an optical element and the optical element, the optical element having an artificially changed effective permeability and having a large cross-sectional area of incidence of light.

The present invention provides a method of making an optical element and the optical element having the following configurations.

According to an aspect of the present invention, a method of making an optical element, the optical element including magnetic resonators that are anisotropically shaped and smaller than a wavelength of incident light, includes a first step of dispersing the magnetic resonators in a host medium, a second step of applying an external magnetic field to the host medium after the first step, and a third step of curing the host medium after the second step.

According to another aspect of the present invention, an optical element includes a plurality of magnetic resonators that are anisotropically shaped and smaller than a wavelength of incident light, and a host medium in which the plurality of magnetic resonators are dispersed, the host medium having a single layer including upper and lower surfaces either of which being an incident surface to which the incident light is incident, wherein the plurality of magnetic resonators are two-dimensionally arranged in an in-plane direction parallel to the incident surface of the host medium, and wherein the plurality of magnetic resonators have the same orientation so that resonance directions of the magnetic resonators are parallel to the incident surface.

The present invention provides a method of making an optical element and the optical element in which the effective permeability is artificially changed and the cross-sectional area of incidence to which light is incident can be increased.

Further features of the present invention will become apparent from the following description of exemplary embodiments with reference to the attached drawings.

DESCRIPTION OF THE EMBODIMENTS

Embodiments of a method of making an optical element and the optical element according to the present invention will be described with reference to the drawings. In the following description, members having the same function will be denoted by the same numeral and redundant description will be omitted.

EMBODIMENTS

First Embodiment

Figure 1A:
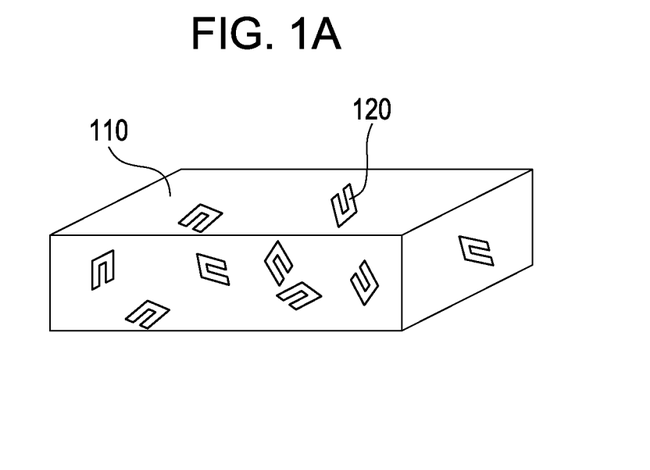
FIGS. 1A to 1C illustrate a method of making an optical element according to a first embodiment of the present invention.
Figure 1B:
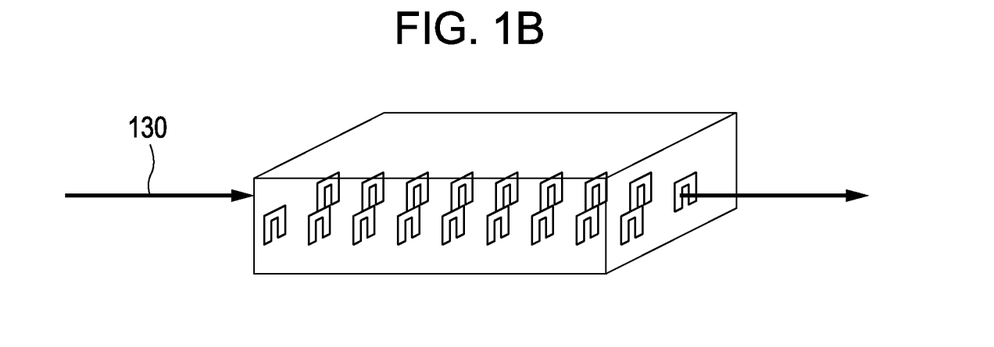
Figure 1C:
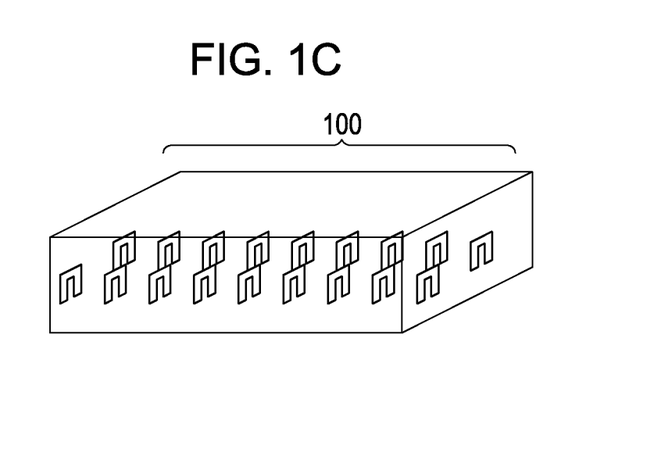

Referring to FIGS. 1A to 1C, a method of making an optical element, which includes magnetic resonators that are anisotropically shaped and smaller than the wavelength of incident light, according to the first embodiment of the present invention will be described. In the first step, magnetic resonators 120 are dispersed in a host medium made of a resin 110 (FIG. 1A). At this time, the magnetic resonators 120 are disposed in random orientations or in biased orientations. In the second step, an external magnetic field 130 is applied so as to control the orientations and the distribution density of the magnetic resonators 120 (FIG. 1B). In the third step, the resin 110 is cured while the external magnetic field 130 is being applied or when the external magnetic field 130 has been applied, whereby an optical element 100 is obtained (FIG. 1C). A thermoplastic resin, a thermosetting resin, a photo-curable resin, or the like may be used as the resin 110. When a thermoplastic resin is used, the second step is performed when the resin has been heated and softened, and subsequently the resin is cooled and cured (in the third step). When a thermosetting resin or a photo-curable resin is used, the second step is performed while the resin is uncured, and subsequently the resin is cured with heat or light (in the third step). By performing the first to third steps as described above, the optical element 100 can be produced so that the magnetic resonators 120 have the same appropriate orientation and a controlled distribution density.

Figure 2:
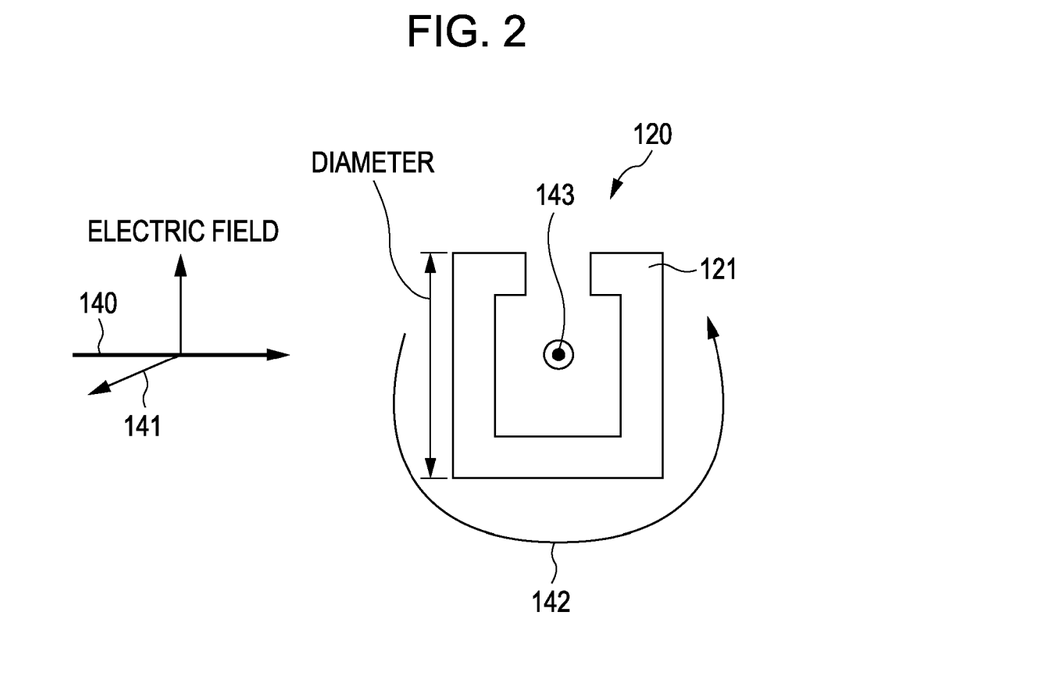
FIG. 2 schematically illustrates a magnetic resonator according to the first embodiment of the present invention.

Next, the characteristics of the magnetic resonators 120 and how the orientations and the distribution density of the magnetic resonators 120 influence the effective permeability of the optical element will be described. Referring to the schematic view of FIG. 2, at least a part of each of the magnetic resonators 120 according to the present embodiment is made of a metal. For example, the magnetic resonator 120 is a single split-ring resonator including a split ring 121 made of gold or silver. If, for example, the magnetic resonator 120 is made to operate in a visible range, the diameter of the split ring 121 may be in the range from 10 nm to 100 nm. If the magnetic resonator 120 is made to operate in a near infrared range, the diameter of the split ring 121 may be in the range from 100 nm to 500 nm. The diameter of the split ring 121, which depends on the material, the thickness, and the shape thereof, is calculated by carrying out an electromagnetic field analysis of the split ring 121 and the material of a portion adjacent to the split ring 121. When a light wave 140 having a resonant frequency is incident on the magnetic resonator 120, a magnetic field component 141 of the light wave 140 interacts with a magnetic field 143 generated by a motion 142 of free electrons.

Figure 3:
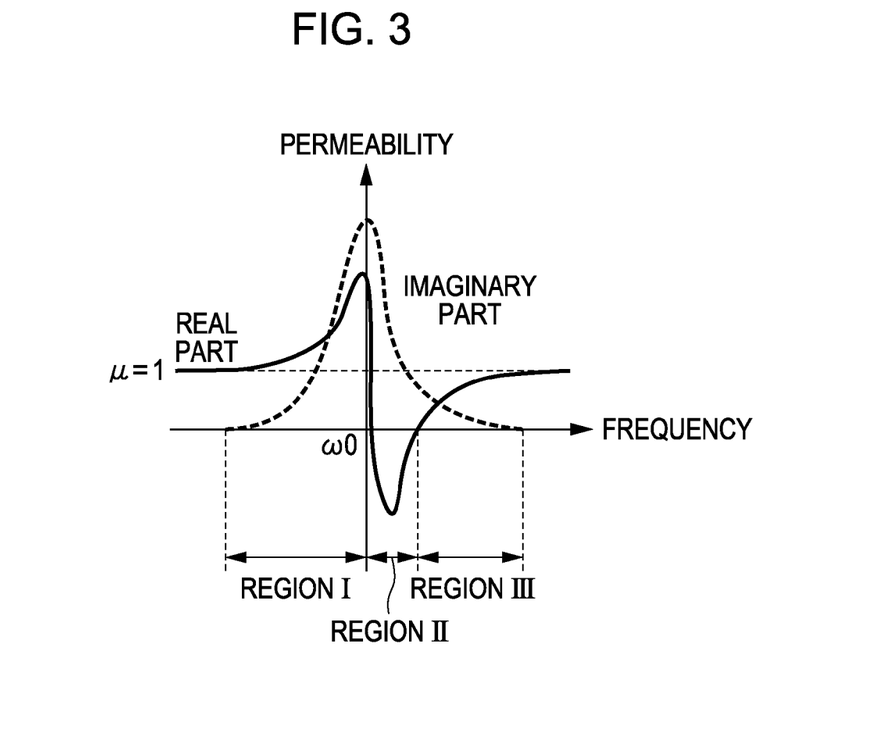
FIG. 3 illustrates the permeability characteristic of the magnetic resonator according to the first embodiment of the present invention.

At this time, the relationship between the magnetic field component 141 of the light wave 140 and the magnetic flux density in the magnetic resonator 120, which is represented by the permeability, exhibits a frequency response illustrated in FIG. 3. FIG. 3 illustrates the magnitude of permeability (vertical axis) versus the frequency of a light wave (horizontal axis). In general, a permeability is a complex number. The real part of the permeability is shown by a solid line and the imaginary part of the permeability is shown by a dotted line. The permeability changes considerably around a resonant frequency $\omega 0$. By using a frequency band in a region I, a positive permeability larger than 1 can be obtained. By using a frequency band in a region II, a negative permeability can be obtained. By using a frequency band in a region III, a positive permeability smaller than 1 can be obtained. The optical element 100, which includes the magnetic resonators 120, has an effective permeability $\mu_{\mathit{eff}}$ that is averaged by including the characteristics of the magnetic resonators 120. The effective permeability $\mu_{\mathit{eff}}$, which is determined by the magnetic field component of the light wave and the magnetic flux density that is changed by the sum of the magnetic field resonance, is represented by the following equation using the surface integral of the magnetic field H and the line integral of the magnetic flux density B.

$$\mu_{\mathit{eff}} = \frac{\int_S B \cdot dS}{\int_r H \cdot dr}$$

Figure 4A:
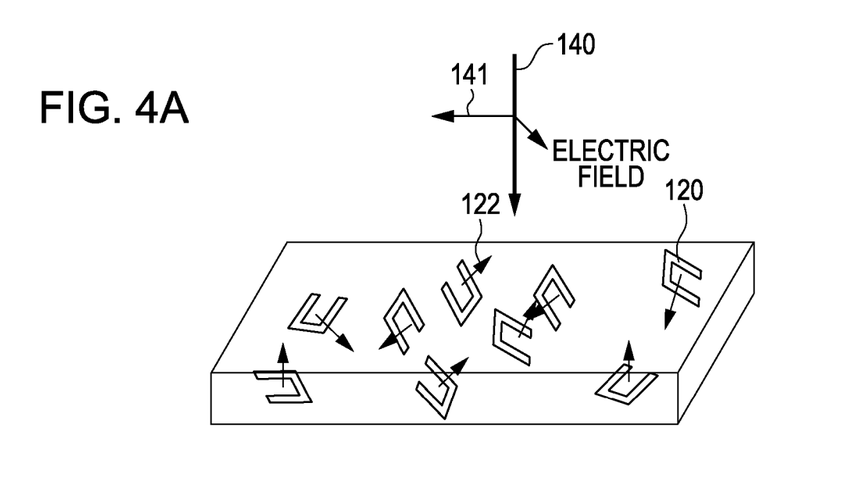
FIGS. 4A to 4C illustrate the necessity of making the magnetic resonators according to the first embodiment of the present invention have the same orientation, and illustrate the control of the effective permeability of the optical element by changing the distribution density of the magnetic resonators.
Figure 4B:
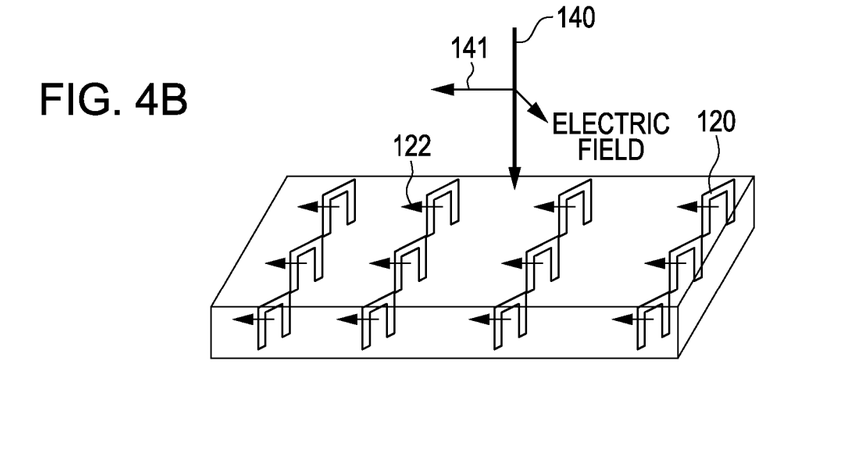
Figure 4C:
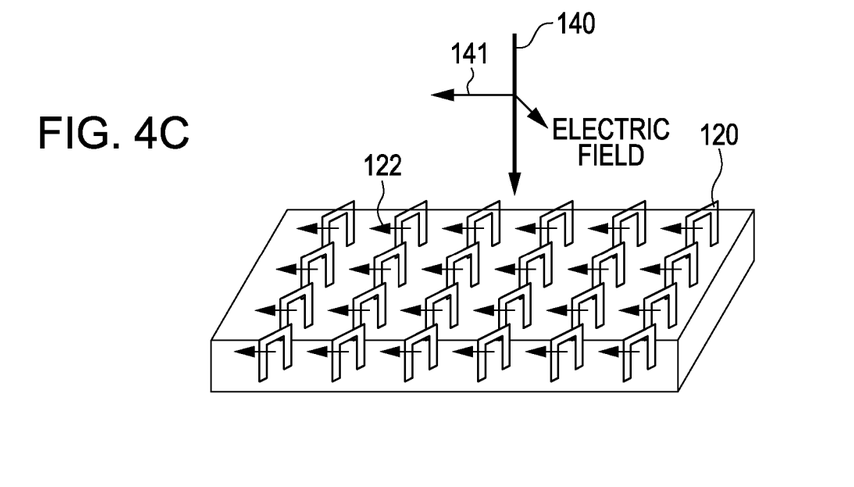

As illustrated in FIG. 4A, when the magnetic resonators 120 are disposed in random orientations, resonance directions 122 of the magnetic resonators 120 are random, and the magnetic resonances cancel each other out. Thus, the optical element 100 does not cause magnetic field resonance with the light wave 140 or causes only weak magnetic field resonance. Therefore, the effect of using the magnetic resonators 120 is small, and the effective permeability of the optical element is approximately the same as that of the resin 110 that is the host medium. In contrast, when the resonance directions 122 of the magnetic resonators are parallel to each other as illustrated in FIG. 4B, the magnetic resonances reinforce each other, and the magnetic flux density is substantially changed in the optical element. Thus, the effective permeability of the optical element 100 is determined by the permeability of the magnetic resonator illustrated in FIG. 3 and the permeability of the host medium. Therefore, in order to obtain an optical element in which the effective permeability is artificially changed, it is necessary to produce the magnetic resonators 120 so that the magnetic resonators 120 have the same orientation. As illustrated in FIG. 4C, when the distribution density of the magnetic resonators 120 included in the optical element is increased, the magnetic flux density can be changed by a greater amount by the magnetic resonators. Thus, as compared with the case of FIG. 4B, the effective permeability of the optical element is close to the permeability of the magnetic resonators. Therefore, when the magnetic resonators have the same orientation, the effective permeability of the optical element can be controlled by changing the distribution density the magnetic resonator. Heretofore, the necessity of producing the magnetic resonators so that the magnetic resonators have the same orientation and the controlling of the effective permeability of the optical element by changing distribution density of the magnetic resonators have been described.

Next, a method of making the magnetic resonators 120 that are dispersed in the resin 110 in the first step will be described. First, a separation layer is deposited on a substrate. Next, gold or silver, which is a material of the magnetic resonator, is deposited on the separation layer. Subsequently, split-ring shapes are formed by lithography or imprinting. Lastly, the separation layer is wet-etched and dissolved, the split-ring shapes to become the magnetic resonators are split, and the magnetic resonators 120 are made. The method of making the magnetic resonators 120 is not limited to this, and may be made in a self-organizing manner.

Figure 5A:
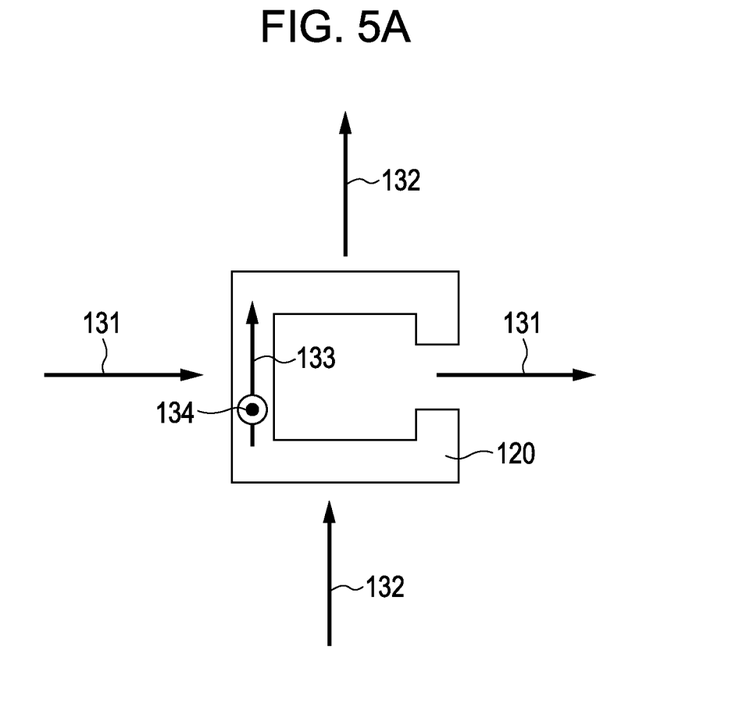
FIGS. 5A and 5B illustrate a method used to make the magnetic resonators have the same orientation in the second step of the method of making an optical element according to the first embodiment of the present invention.
Figure 5B:
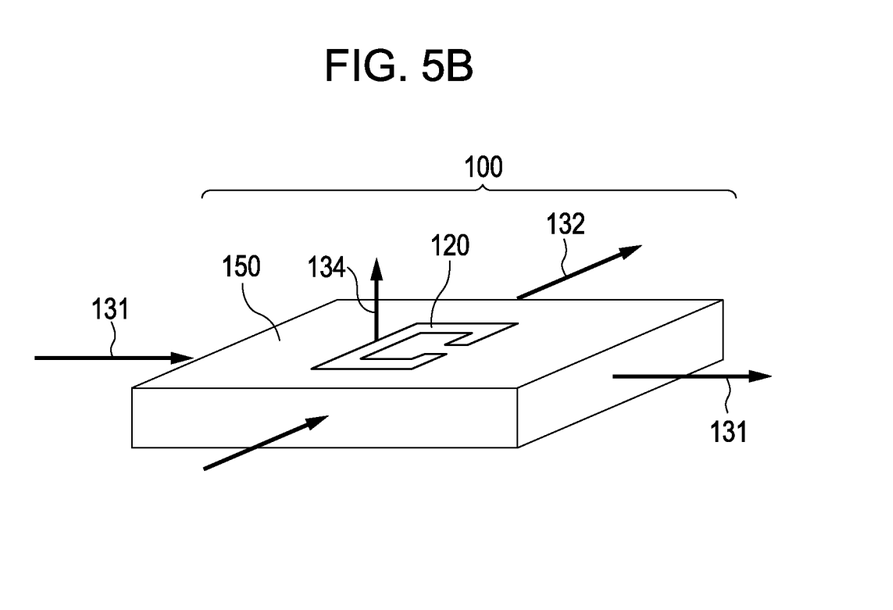

Referring to FIGS. 5A and 5B, a method of making the magnetic resonators 120 have the same orientation in the second step will be described. In order to make the magnetic resonators 120 have the same orientation in the second step, the Lorentz force is used. As illustrated in FIG. 5A, an external alternating magnetic field 131, which is an external magnetic field, and an external alternating electric field 132, which has the same frequency as the external alternating magnetic field 131, are applied in directions perpendicular to each other. At this time, the external alternating electric field 132 moves free electrons in the magnetic resonator 120, so that an alternating current 133 is generated. The alternating current 133 and the external alternating magnetic field 131 generate a Lorentz force 134 in the direction of the outer product of the alternating current 133 and the external alternating magnetic field 131. The magnetic resonators 120 are made to have the same orientation by using the Lorentz force 134. As illustrated in FIG. 5B, the external alternating magnetic field 131 and the external alternating electric field 132 are applied in directions that are substantially parallel to an incident surface 150 of the optical element 100. At this time, the Lorentz force 134 acts in a direction that is perpendicular to the incident surface 150, and the magnetic resonators 120 are made to have the same orientation so that the resonance directions of the magnetic resonators 120 are parallel to the incident surface 150. The magnitude of the external alternating magnetic field 131 is in the range from 0.01 tesla to several tesla so that the Lorentz force 134 can overcome the viscosity of the resin 110. When the magnitude of the external alternating magnetic field 131 is smaller than about 1 tesla, a permanent magnet can be used as a magnetic field source. When the magnitude of the external alternating magnetic field 131 is equal to or larger than 1 tesla, a superconducting coil or the like can be used. The magnitude of the external alternating magnetic field may be appropriately changed in accordance with the viscosity and the position of the resin, the electric conductivity of the material of the magnetic resonator, and the magnitude of the external alternating electric field.

Figure 6:
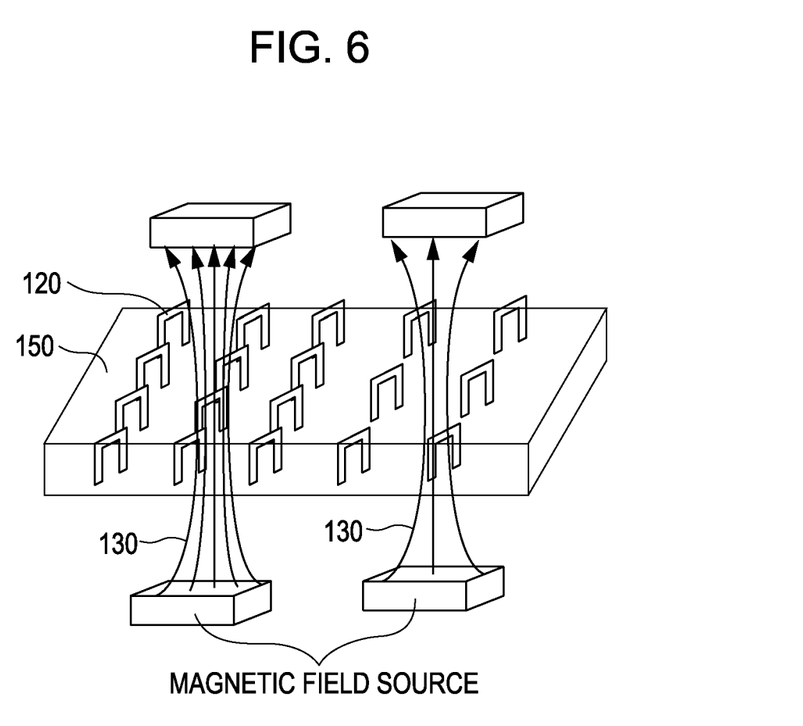
FIG. 6 illustrates a method of controlling the orientations and the distribution density of the magnetic resonators in the second step of the method of making an optical element according to the first embodiment of the present invention.

Next, a method of controlling the orientations of the magnetic resonators 120 in the incident surface 150 of the optical element or controlling the distribution density in the second step will be described. As illustrated in FIG. 6, the external magnetic field 130 is spatially changed in the incident surface 150 of the optical element. Thus, the orientations or the distribution density of the magnetic resonators 120 can be appropriately controlled in the incident surface of the optical element. In the present embodiment, the magnetic resonators 120 having the single split-ring structure is used. However, the magnetic resonators 120 may have a double split-ring structure, or magnetic resonators that cause metal inter-dot resonance may be used. By performing the first to third steps described above, an optical element having a large cross-sectional area of incidence and an artificially controlled effective permeability can be produced.

Second Embodiment

Figure 7A:
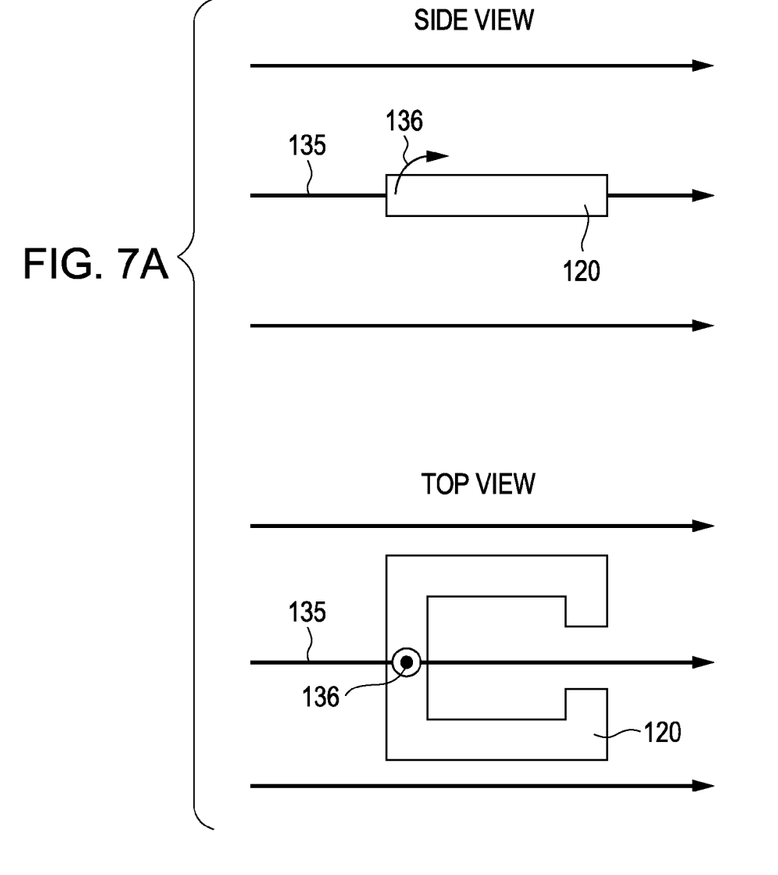
FIGS. 7A and 7B illustrate a method of making an optical element according to a second embodiment the present invention.
Figure 7B:
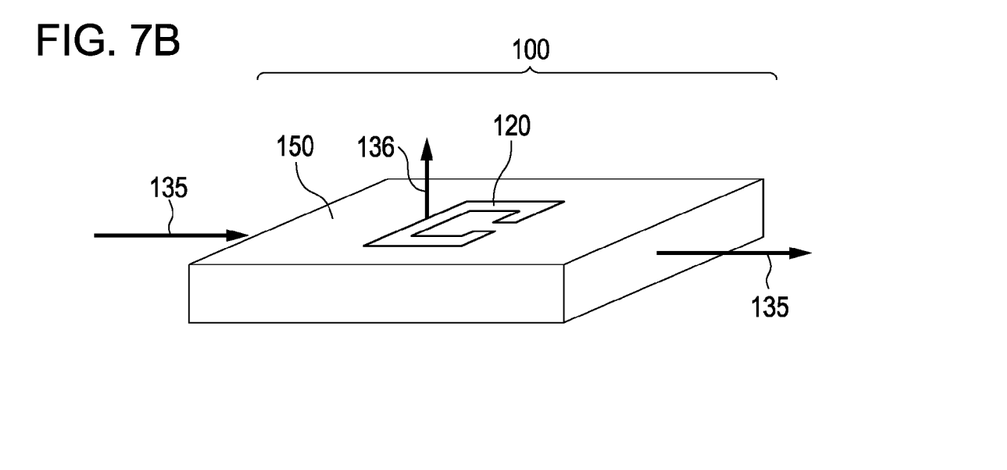

A second embodiment differs from the first embodiment in the second step of applying the external magnetic field 130 and making the magnetic resonators 120 have the same orientation. The descriptions of the magnetic resonators 120 and the resin 110 of the optical element 100, which are the same as those of the first embodiment, are omitted. As illustrated in FIGS. 7A and 7B, in the second step of the present embodiment, the magnetic resonators 120 are made to have the same orientation by using a repulsive force that acts between an external magnetic field and a diamagnetic substance, such as gold or silver, to which the external magnetic field is applied. In each of the magnetic resonators 120 made of a diamagnetic substance, magnetization is generated by an external magnetic field. At this time, because the magnetic resonator 120 is anisotropically shaped, a force 136 acts on the magnetic resonator 120 so as to stabilize the magnetic resonator 120 with respect to the magnetization generated by an external magnetic field 135. By using the force 136, the magnetic resonators 120 are made to have the same orientation.

Figure 8:
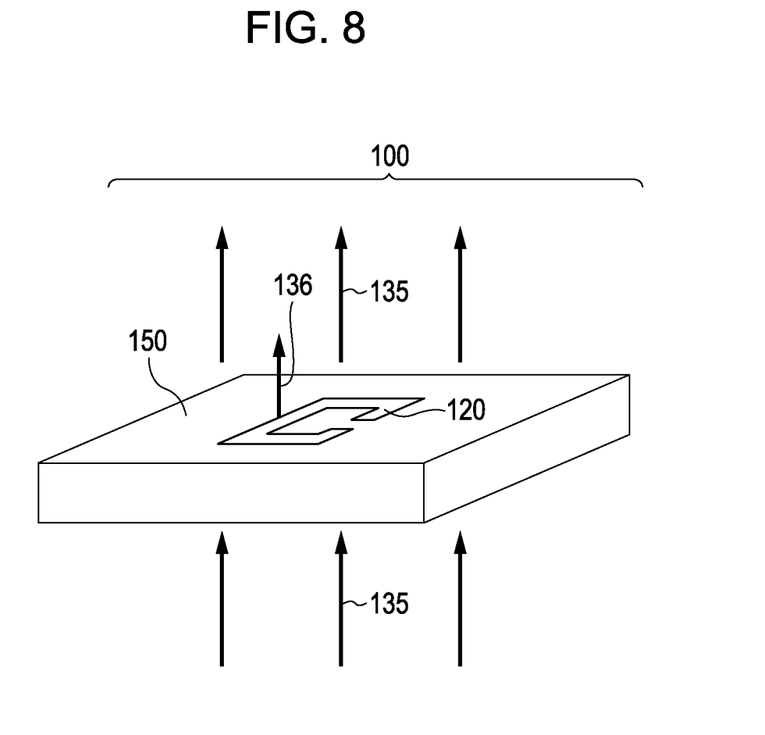
FIG. 8 illustrates the method of making an optical element according to the second embodiment the present invention.

When the external magnetic field 135 is applied in a direction that is substantially parallel to the incident surface 150 of the optical element 100, the magnetic resonators 120 are made to have the same orientation so that the resonance directions of the magnetic resonators 120 are parallel to the incident surface 150. At this time, the magnitude of the external magnetic field 135 is determined so that the force 136 can overcome the viscosity of the resin 110. In the present embodiment, the magnetic resonator 120 is made of a diamagnetic substance such as gold or silver. However, at least a part of the magnetic resonator may be made of a paramagnetic substance or a ferromagnetic substance instead of a diamagnetic substance. When the magnetic resonator is made of a paramagnetic substance or a ferromagnetic substance, the magnetic resonator is attracted by an external magnetic field. Therefore, as illustrated in FIG. 8, by applying the external magnetic field in a direction substantially perpendicular to the incident surface, the magnetic resonators can be made to have the same orientation so that the resonance directions of the magnetic resonators are parallel to the incident surface.

Third Embodiment

Figure 9:
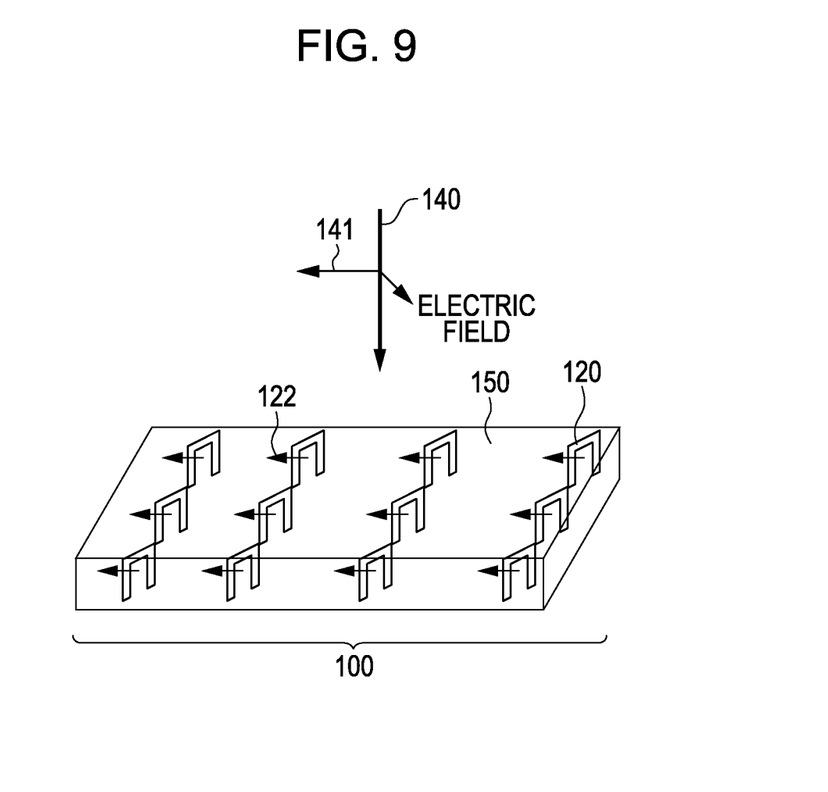
FIG. 9 illustrates a method of making an optical element according to a third embodiment of the present invention.
Figure 10A:
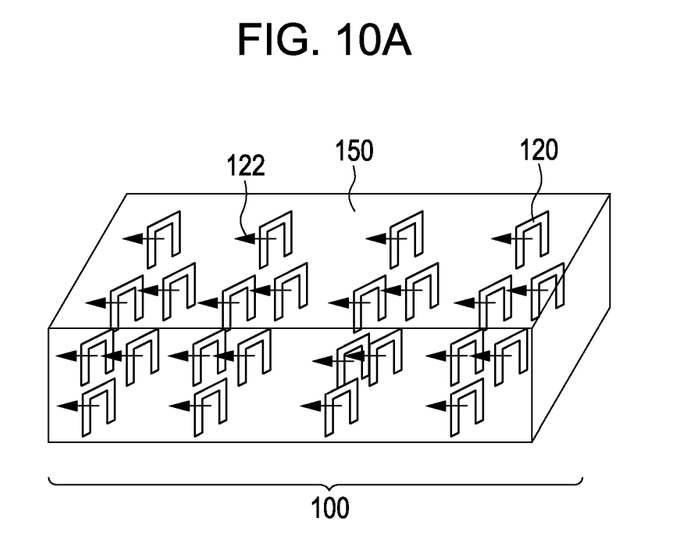
FIGS. 10A and 10B illustrate the method of making an optical element according to the third embodiment of the present invention.
Figure 10B:
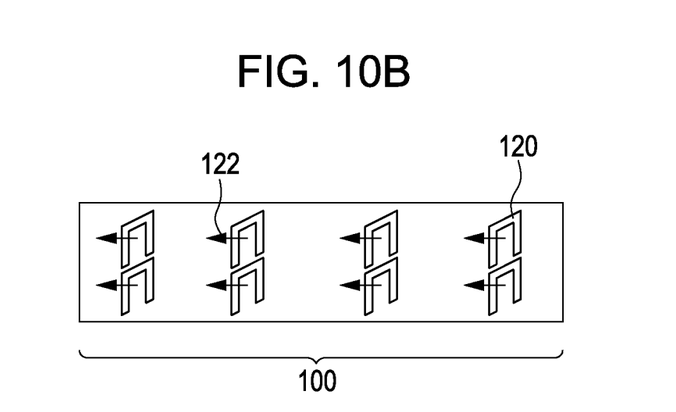

Referring to FIG. 9, an optical element according to a third embodiment will be described. The optical element 100 includes the magnetic resonators 120 and the host medium. The magnetic resonators 120 are anisotropically shaped and smaller than the wavelength of incident light. The magnetic resonators 120 are dispersed in the host medium having a single layer made of the resin 110. Either of the upper and lower surfaces of the single layer is the incident surface 150 to which the incident light is incident. The optical element 100 can be made by using the method according to the first embodiment or the second embodiment. The magnetic resonators 120 are two-dimensionally arranged in an in-plane direction parallel to the incident surface 150 of the host medium. The magnetic resonators 120 have the same orientation so that the resonance directions of the magnetic resonators are parallel to the incident surface 150. With the structure of the present embodiment, the incident light wave 140 can be made to be perpendicularly incident on the incident surface 150 so that the magnetic field component 141 of the light wave corresponds to the resonance direction 122. Therefore, the cross-sectional area of incidence of the optical element 100 can be made larger than that of the existing optical element (FIG. 11). In the present embodiment, it is assumed that the incident surface 150 is flat. However, the incident surface 150 may be a curved surface such as a surface of a lens, instead of being flat. In this case, a surface that is tangent to the curved surface at the vertex may be considered to be the incident surface 150. As illustrated in FIGS. 10A and 10B, by disposing the two-dimensionally arranged magnetic resonators in two tiers in the thickness direction of the optical element, the optical element can be made thick, whereby the effective permeability of the optical element in the depth direction can be controlled.

By using the method illustrated in FIG. 6, the distribution density of the magnetic resonators in the incident surface of the optical element and the resonance directions of the magnetic resonators can be controlled, whereby an optical element having a permeability distribution can be produced. Because the refractive index of the optical element is determined by the permeability and the permittivity, the optical element having a permeability distribution functions as an optical element having a refractive index distribution, whereby the wavefront of a light wave can be controlled. The magnetic resonators 120 used in the present embodiment is made of a magnetic substance such as gold or silver. It is preferable that the magnetic resonators 120 be made of a magnetic substance because the orientations and the distribution density of the magnetic resonators 120 can be appropriately controlled by using the method described in the second embodiment. However, it is not necessary that the magnetic resonators 120 be made of a magnetic substance. As long as the resonance directions of the magnetic resonators 120 can be made parallel to the incident surface of the optical element, the magnetic resonators 120 may be made of, for example, a diamagnetic substance as described in the second embodiment. In the present embodiment, the host medium is made of a resin. However, the material of the host medium is not limited to a resin, and may be a substance that is transparent with respect to the wavelength used and that can be cured and softened by using heat or light, such as quartz glass. However, it is preferable to use a resin, because an optical element can be easily produced by using techniques such as molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-212764, filed Sep. 15, 2009, which is hereby incorporated by reference herein in its entirety.

What is claimed is:

1. A method of making an optical element that includes magnetic resonators that are anisotropically shaped and smaller than a wavelength of incident light, the method comprising:

a first step of dispersing the magnetic resonators in a host medium;

a second step of applying an external magnetic field to the host medium after the first step; and a third step of curing the host medium after the second step.

2. The method of making the optical element according to claim 1, wherein at least a part of each of the magnetic resonators that are dispersed in the host medium in the first step is made of a metal, and wherein, in the second step of applying the external magnetic field to the host medium, an external alternating magnetic field that is the external magnetic field and an external alternating electric field having the same frequency as the external alternating magnetic field are respectively applied in directions perpendicular to each other so as to make the magnetic resonators have the same orientation.

3. The method of making an optical element according to claim 2, wherein the external alternating magnetic field and the external alternating electric field are applied in directions that are substantially parallel to an incident surface of the optical element.

4. The method of making an optical element according to claim 1, wherein at least a part of each of the magnetic resonators that are dispersed in the host medium in the first step is made of a magnetic substance, and wherein, in the second step, the external magnetic field is applied to the host medium in which the magnetic resonators made of the magnetic substance are dispersed.

5. The method of making an optical element according to claim 4, wherein the magnetic substance is a diamagnetic substance, and the external magnetic field is applied in a direction that is substantially parallel to the incident surface of the optical element.

6. A method of making an optical element according to claim 4, wherein the magnetic substance is a paramagnetic substance or a ferromagnetic substance, and the external magnetic field is applied in a direction substantially perpendicular to the incident surface of the optical element.

7. The method of making an optical element according to claim 1, wherein, in the second step of applying the external magnetic field to the host medium in which the magnetic resonators are dispersed, the magnetic field is applied with different directions and with different strength in accordance with a position of the host medium.

* * * * *